(12) United States Patent
Long

(10) Patent No.: US 8,833,195 B2
(45) Date of Patent: Sep. 16, 2014

(54) GEAR BACKLASH ADJUSTING MECHANISM AND ROBOT ARM ASSEMBLY HAVING THE SAME

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 180 days.

(21) Appl. No.: 13/427,920

(22) Filed: Mar. 23, 2012

(65) Prior Publication Data
US 2013/0133452 A1    May 30, 2013

(30) Foreign Application Priority Data

Nov. 30, 2011    (CN) .......................... 2011 1 0389650

(51) Int. Cl.
| | |
|---|---|
| F16H 55/18 | (2006.01) |
| B25J 17/00 | (2006.01) |
| B25J 17/02 | (2006.01) |
| B25J 18/00 | (2006.01) |

(52) U.S. Cl.
USPC .......................................... 74/490.01; 74/409

(58) Field of Classification Search
USPC ............... 74/395, 396, 397, 409, 411, 490.01
See application file for complete search history.

(56) References Cited

U.S. PATENT DOCUMENTS 2,313,444 A * 3/1943 Lamb .............................. 74/461

* cited by examiner

*Primary Examiner* — Justin Krause
(74) *Attorney, Agent, or Firm* — Novak Druce Connolly Bove + Quigg LLP

(57) ABSTRACT

A gear backlash adjusting mechanism includes a base, a first gear, a first elastic gear meshing with the first gear, a bearing sleeved on the first gear, and a bearing box over the bearing, and mounted on the base. The first elastic gear includes an outer ring, an inner ring, and an elastic member mounted between the outer ring and the inner ring. The position of the bearing box relative to the base can be adjusted, to push the first elastic gear via the first gear. The elastic member is deformed and provides elastic force to push the first elastic gear to tightly mesh with the first gear.

17 Claims, 3 Drawing Sheets

GEAR BACKLASH ADJUSTING MECHANISM AND ROBOT ARM ASSEMBLY HAVING THE SAME

BACKGROUND

1. Technical Field

The present disclosure relates to adjusting mechanisms, particularly to a gear backlash adjusting mechanism and a robot arm assembly having the gear backlash adjusting mechanism.

2. Description of Related Art

An industrial robot may include a plurality of arms connected in series. A welding device, a gripper or a cutting tool, may be mounted at a distal arm of the industrial robot to execute specific tasks. Six different axes may provide a maximum range of movements. Each arm of the industrial robot rotates around a rotation axis driven by a driving unit. The driving unit may include a motor mounted on one arm and a gear transmission mechanism coupled to the motor to transmit the movement of the motor to another arm.

The working range and capacity for movement of an industrial robot depend on, among other things, the gear transmission mechanism included. As backlash between meshed gears in the gear transmission mechanism increases, life and precision of the gear transmission mechanism decreases. The backlash may be a result of aggravated abrasion which cause deterioration in the meshing condition.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
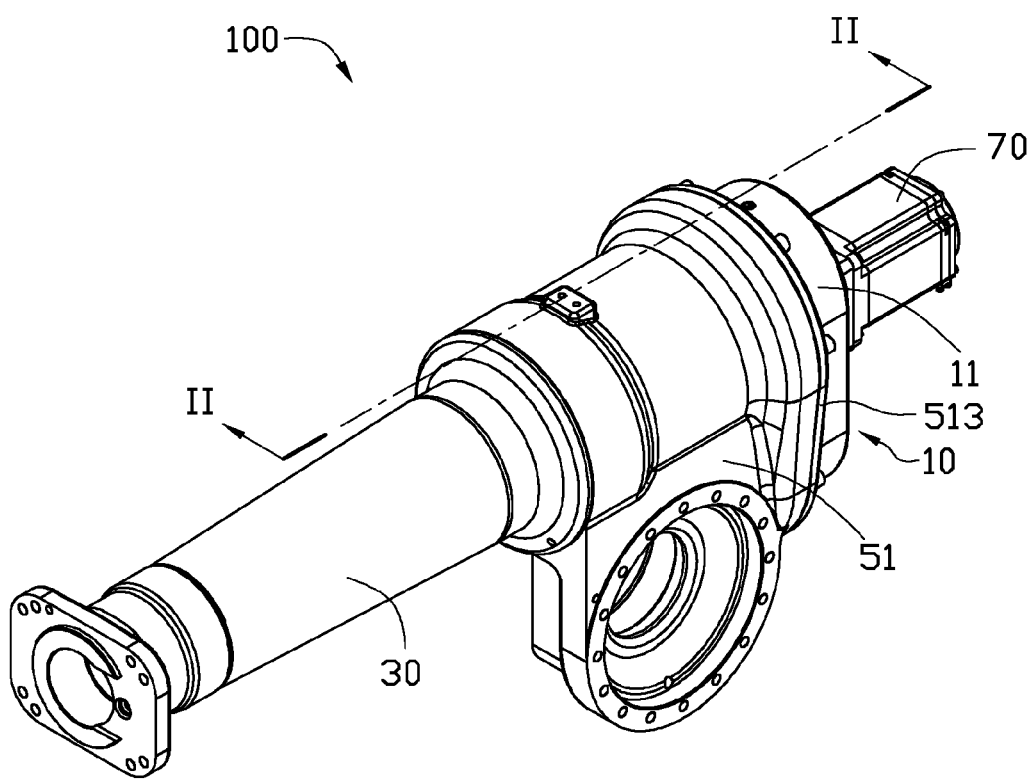
FIG. 1 is an isometric view of an embodiment of a robot arm assembly.
Figure 2:
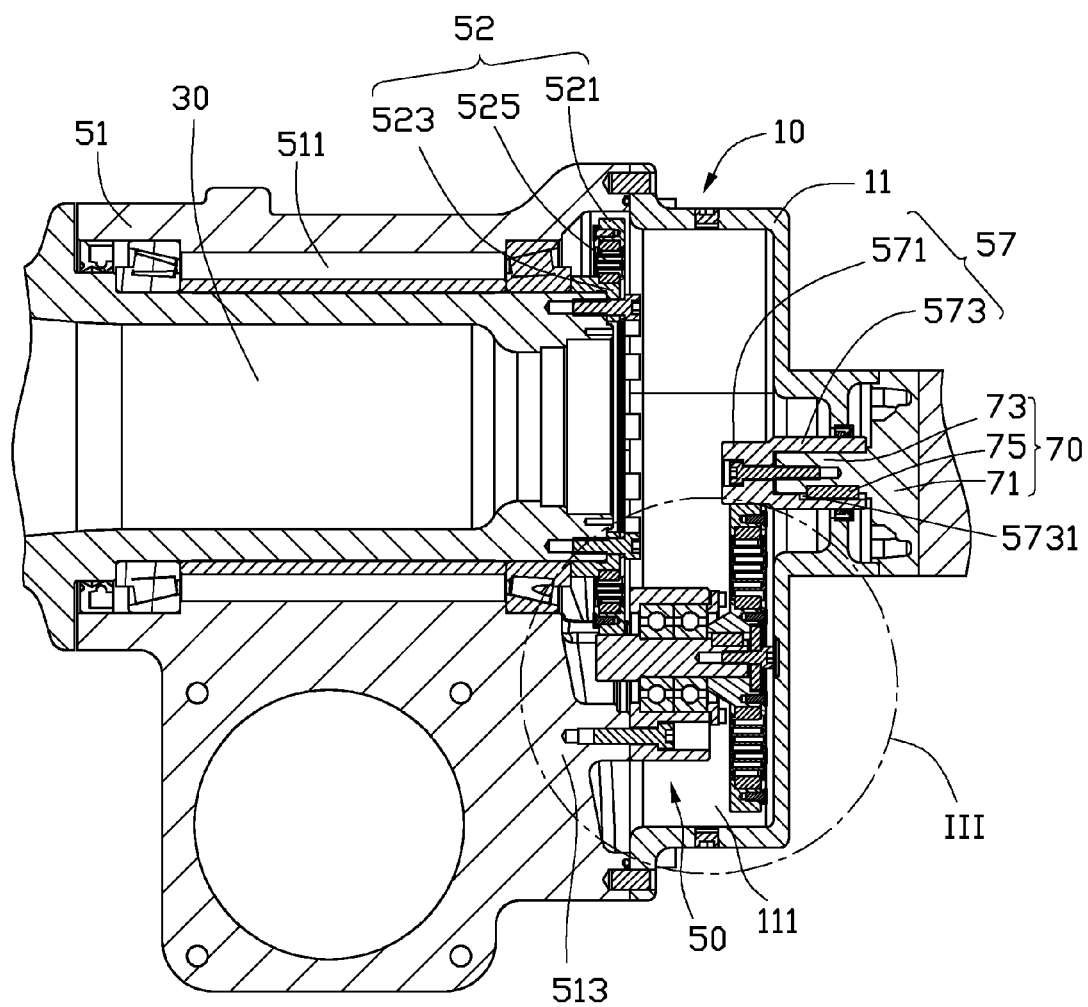
FIG. 2 is a partial, enlarged, cross-sectional view taken along line II-II shown in FIG. 1.

Referring to FIGS. 1 and 2, an embodiment of a robot arm assembly 100 is used in an industrial six-axis robot (not shown), the robot arm assembly 100 includes a first mechanical arm 10 (only a portion of the arm is shown), a second mechanical arm 30, a gear backlash adjusting mechanism 50, and a driving mechanism 70. The second mechanical arm 30 rotatably connects with the first mechanical arm 10. The gear backlash adjusting mechanism 50 and the driving mechanism 70 are mounted on the first mechanical arm 10, and the driving mechanism 70 drives the first mechanical arm 10 to rotate.

The first mechanical arm 10 includes a main body 11, and the main body 11 defines a receiving chamber 111. The gear backlash adjusting mechanism 50 is received in the receiving chamber 111. The second mechanical arm 30 is hollow, and the gear backlash adjusting mechanism 50 is fixed at an end.

Figure 3:
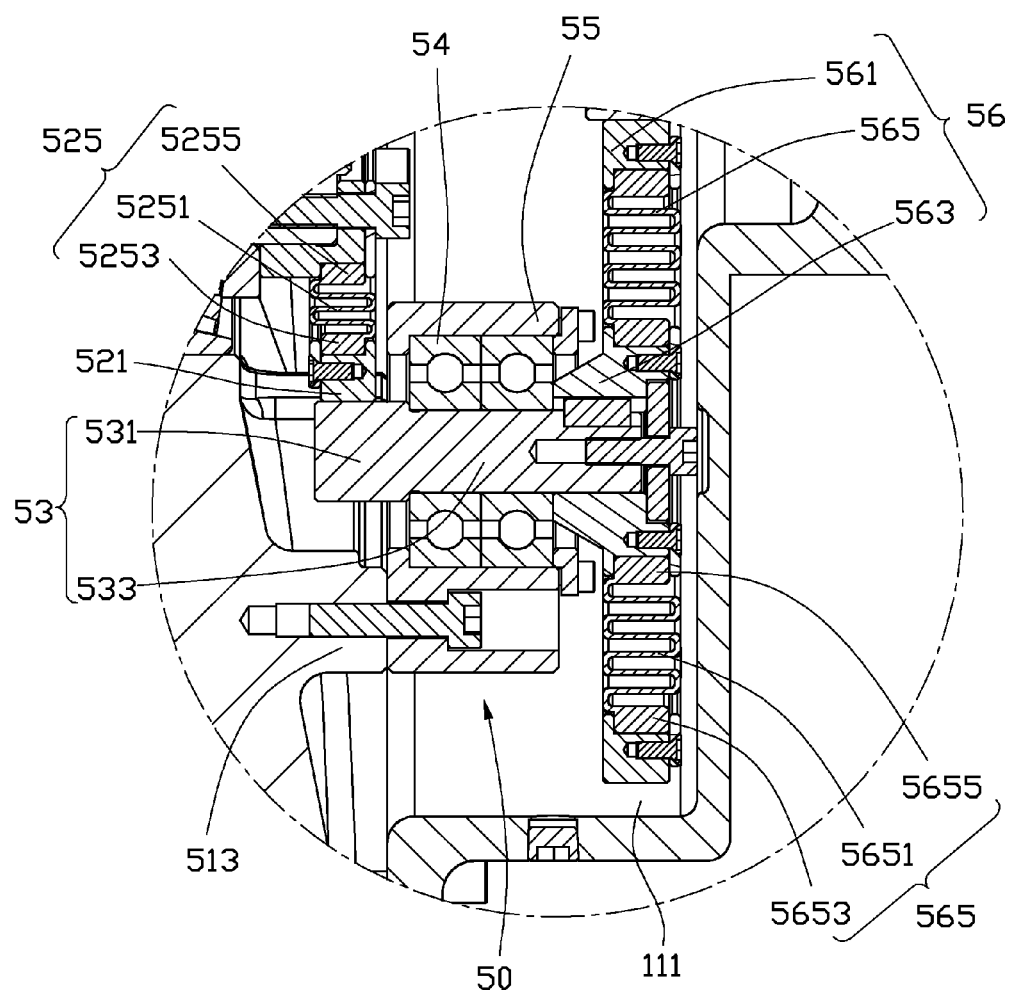
FIG. 3 is an enlarged, isometric view of circled portion III of FIG. 2.

Referring to FIG. 3, the gear backlash adjusting mechanism 50 includes a base 51, a first elastic gear 52, a first gear 53, a bearing 54, a bearing box 55, a second elastic gear 56, and a second gear 57. The base 51 is sleeved on the second mechanical arm 30, and fixed with an end of the main body 11. The base 51 is a shell, and defines a through hole 511 along the axis. The second mechanical arm 30 passes through the through hole 511, and rotatably connects with the base 51. The base 51 forms a mounting portion 513 at the end adjacent to the first mechanical arm 10, for mounting the gear backlash adjusting mechanism 50.

The first elastic gear 52 is positioned besides the mounting portion 513 adjacent to the second mechanical arm 30, and includes an outer ring 521, an inner ring 523, and an elastic member 525 mounted between the outer ring 521 and the inner ring 523. The elastic member 525 includes a portion which in section resembles a concertina (bent portion 5251), a first end portion 5253 formed at the outer sectional extent of the bent portion 5251, and a second end portion 5255 formed at the inner sectional extent of the bent portion 5251. The outer ring 521 is sleeved on the elastic member 525, and the outer sidewall of the outer ring 521 has a plurality of gearing teeth (not shown). The inner sidewall of the outer ring 521 is fixed with the elastic member 525. The elastic member 525 is sleeved on the inner ring 523, and the second end portion 5255 is fixed with the outer sidewall of the inner ring 523. The inner ring 523 is fixed with the second mechanical arm 30, so the second mechanical arm 30 is rotated by the first elastic gear 52. In the illustrated embodiment, a top plan view of the bent portion 5251 shows concentric rings formed by a plurality of bends.

The first gear 53 meshes with the first elastic gear 52, and is located beside the first elastic gear 52 adjacent to the mounting portion 513. The first gear 53 includes a gearing portion 531 adjacent to the mounting portion 513 and a shaft portion 533 perpendicularly extending from the gearing portion 531 away from the mounting portion 513. The gearing portion 531 meshes with the outer ring 521 of the first elastic gear 52, to allow the first elastic gear 52 to drive the first gear 53 to rotate. The bearing 54 is sleeved on the shaft portion 533 of the first gear 53. The bearing box 55 is sleeved on the bearing 54, and fixed with the mounting portion 513. In the illustrated embodiment, there are two of the bearings 54.

The second elastic gear 56 is sleeved on an end of the first gear 53 away from the mounting portion 513. The structure of the second elastic gear 56 is similar to the structure of the first elastic gear 52. The second elastic gear 56 includes an outer ring 561, an inner ring 563, and an elastic member 565 mounted between the outer ring 561 and the inner ring 563. The elastic member 565 includes a bent portion 5651, a first end portion 5653 formed at the outer sectional extent of the bent portion 5651, and a second end portion 5655 formed at the inner sectional extent of the bent portion 5651. The outer ring 561 is sleeved on the elastic member 565, and the outer sidewall of the outer ring 561 forms a plurality of gearing teeth (not shown). The inner sidewall of the outer ring 561 is fixed with the elastic member 565. The elastic member 565 is sleeved on the inner ring 563, and the second end portion 5655 is fixed with the outer sidewall of the inner ring 563. The inner ring 563 is sleeved on the first gear 53, so the first gear 53 is capable of rotating the second elastic gear 56. In the illustrated embodiment, the bent portion 5651 is of the same material(s) and has the same construction as the bent portion 5251.

The second gear 57 meshes with the second elastic gear 56, and is located beside the second elastic gear 56 adjacent to the first mechanical arm 10. The second gear 57 includes a gearing portion 571 and a shaft portion 573 perpendicularly extending from the gearing portion 571 towards the first mechanical arm 10. The gearing portion 571 meshes with the outer ring 561 of the second elastic gear 56, to allow the second elastic gear 56 to rotate when driven by the second gear 57. The shaft portion 573 defines a fixing hole (not labeled) along the axis, and the sidewall of the fixing hole defines a groove 5731 parallel to the axis. The shaft portion 573 is sleeved on the driving mechanism 70, so the driving mechanism 70 can rotate the second gear 57.

The driving mechanism 70 is mounted on the first mechanical arm 10, and includes a drive member 71, a drive shaft 73, and a blocking member 75. The drive shaft 73 perpendicularly extends from the drive member 71 towards the second gear 57. The blocking member 75 perpendicularly extends outwards from the sidewall of the drive shaft 73, and is parallel to the axis of the drive shaft 73. The shaft portion 573 of the second gear 57 is sleeved on the drive shaft 73, and the drive shaft 73 is received in the fixing hole. The blocking member 75 is received in the groove 5731. The second gear 57 is secured to the drive shaft 73 via a fastener, and the blocking member 75 engages with the groove 5731 to prevent the second gear 57 from rotating relative to the drive shaft 73. In the illustrated embodiment, the drive member 71 is a motor. The drive member 71 may be other driver, such as a cylinder.

In assembly, the base 51 is sleeved on the second mechanical arm 30, and the first elastic gear 52 is positioned besides the mounting portion 513. The first gear 53 meshes with the first elastic gear 52. The bearing 54 is sleeved on the shaft portion 533. The bearing box 55 is sleeved on the bearing 54, and fixed with the mounting portion 513. The second elastic gear 56 is sleeved on the shaft portion 533, and the second gear 57 meshes with the second elastic gear 56. The second gear 57 is sleeved on the drive shaft 73, the two are fixed together. The main body 11 covers the gear backlash adjusting mechanism 50, and is mounted on the base 51.

In use, the drive member 71 drives the second gear 57 to rotate via the drive shaft 73. The second gear 57 drives the first elastic gear 52 to rotate via the second elastic gear 56, the first gear 53, and the first elastic gear 52. The first elastic gear 52 drives the second mechanical arm 30 to rotate. During unadjusted use, backlash will occur between the first elastic gear 52 and the first gear 53, or between the second elastic gear 56 and the second gear 57, resulting in a low transmission precision and noisiness in operation.

In order to adjust the backlash between the first elastic gear 52 and the first gear 53 and the backlash between the second elastic gear 56 and the second gear 57, the position of the bearing box 55 mounted on the mounting portion 513 needs to be adjusted. The bearing box 55 is detached from the mounting portion 513, and moved towards the first elastic gear 52. The first gear 53 is moved towards the first elastic gear 52, and is imposed on the elastic member 525 to such an extent that the elastic member 525 is elastically deformed. Because the bearing box 55 is sleeved on the bearing 54 and the bearing 54 is sleeved on the shaft portion 533, thus the position of the bearing box 55 relative to the base 51 is adjusted. The outer ring 521 is pressed tightly into the gearing portion 531 by the elastic force of the elastic member 525. At the same time, the second elastic gear 56 is moved towards the second gear 57 by the relocation of the bearing box 55, and imposes itself on the elastic member 565 so the elastic member 565 is elastically deformed. The outer ring 561 is tightly pressed against the gearing portion 571 by the elastic force of the elastic member 565. Then, the bearing box 55 is firmly remounted to the mounting portion 513.

The first gear 53 can be directly connected with the drive shaft 73, and the drive member 71 can drive the first gear 53 directly, and thus the second elastic gear 56 and the second gear 57 can be omitted.

Adjustment of the position of the bearing box 55 relative to the base 51 drives the first elastic gear 52 and the second elastic gear 56 into a deformed state, thus the first elastic gear 52 and the first gear 53, the second elastic gear 56 and the second gear 57 are all tightly pressed and meshed together. That is, the backlash between the gears is almost completely eliminated.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A gear backlash adjusting mechanism, comprising:
   a base;
   a first gear;
   a first elastic gear meshing with the first gear;
   a bearing sleeved on the first gear; and
   a bearing box over the bearing, and mounted on the base;
   wherein the first elastic gear comprises an outer ring, an inner ring, and an elastic member mounted between the outer ring and the inner ring; a position of the bearing box relative to the base is adjustable to push the first elastic gear via the first gear such that the elastic member is deformed to exert an elastic force to push the first elastic gear to tightly mesh with the first gear.

2. The gear backlash adjusting mechanism of claim 1, wherein the outer ring is sleeved on the elastic member; the elastic member is sleeved on the inner ring; an outer circle of the outer ring has gear teeth, the gear teeth of the outer ring are configured to mesh with the first gear.

3. The gear backlash adjusting mechanism of claim 1, wherein the elastic member comprises a bent portion, a first end portion formed at an outer sectional extent of the bent portion, and a second end portion formed at an inner sectional extent of the bent portion; the first end portion is fixed with the outer ring; the second end portion is fixed with the inner ring.

4. The gear backlash adjusting mechanism of claim 3, wherein the elastic member of the first elastic gear is a ring having a plurality of bends.

5. The gear backlash adjusting mechanism of claim 1, wherein the first gear comprises a gearing portion and a shaft portion extending from the gearing portion; the bearing is sleeved on the shaft portion.

6. The gear backlash adjusting mechanism of claim 5, further comprising a second elastic gear and a second gear, wherein the second elastic gear meshes with the second gear; the second elastic gear is sleeved on an end of the shaft portion away from the gearing portion.

7. The gear backlash adjusting mechanism of claim 6, wherein the second elastic gear comprises an outer ring, an inner ring, and an elastic member mounted between the outer ring and the inner ring; the outer ring is sleeved on the elastic member; the elastic member is sleeved on the inner ring.

8. The gear backlash adjusting mechanism of claim 7, wherein the elastic member of the second elastic gear is a ring having a plurality of bends.

9. A robot arm assembly, comprising:
   a first mechanical arm;
   a second mechanical arm movably connecting with the first mechanical arm;
   a driving mechanism adapted to drive the second mechanical arm to rotate; and
   a gear backlash adjusting mechanism mounted on the first mechanical arm and connected to the second mechanical arm and the driving mechanism, the gear backlash adjusting mechanism comprising a base, a first gear, a first elastic gear meshing with the first gear, a bearing sleeved on the first gear, and a bearing box sleeved on the bearing;

wherein the first elastic gear comprises an outer ring, an inner ring, and an elastic member mounted between the outer ring and the inner ring; the inner ring is fixed with the second mechanical arm, to drive second mechanical arm to rotate; a position of the bearing box relative to the base is adjustable by the bearing box to push the first elastic gear via the first gear such that the first elastic gear is deformed and provides an elastic force to tightly mesh with the first gear.

10. The robot arm assembly of claim 9, wherein the outer ring is sleeved on the elastic member; the elastic member is sleeved on the inner ring; an outer circle of the outer ring has gear teeth, the gear teeth of the outer ring are configured to mesh with the first gear.

11. The robot arm assembly of claim 9, wherein the elastic member comprises a bent portion, a first end portion formed at an outer sectional extent of the bent portion, and a second end portion formed at an inner sectional extent of the bent portion; the first end portion is fixed with the outer ring; the second end portion is fixed with the inner ring.

12. The robot arm assembly of claim 11, wherein the elastic member of the first elastic gear is a ring having a plurality of bends.

13. The robot arm assembly of claim 9, wherein the first gear comprises a gearing portion and a shaft portion extending from the gearing portion; the bearing is sleeved on the shaft portion.

14. The robot arm assembly of claim 13, wherein the gear backlash adjusting mechanism further comprises a second elastic gear and a second gear, the second elastic gear meshes with the second gear; the second elastic gear is sleeved on an end of the shaft portion away from the gearing portion.

15. The robot arm assembly of claim 14, wherein the second elastic gear comprises an outer ring, an inner ring, and an elastic member mounted between the outer ring and the inner ring; the outer ring is sleeved on the elastic member; the elastic member is sleeved on the inner ring.

16. The robot arm assembly of claim 15, wherein the elastic member of the second elastic gear is a ring having a plurality of bends.

17. The robot arm assembly of claim 14, wherein the drive member comprises a drive member and a drive shaft extending from the drive member; the second gear is sleeved on the drive shaft.

\* \* \* \* \*